April 20, 1948.  N. STEVENS  2,439,876
TIRE REPAIR DEVICE
Filed Feb. 13, 1945
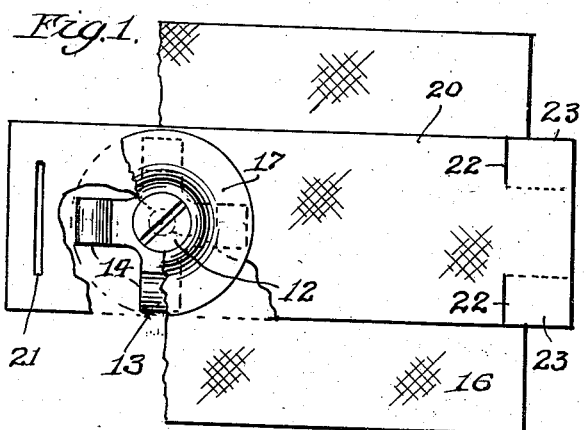
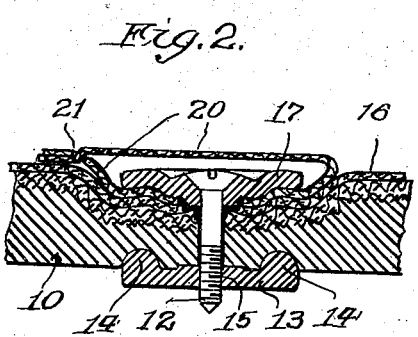
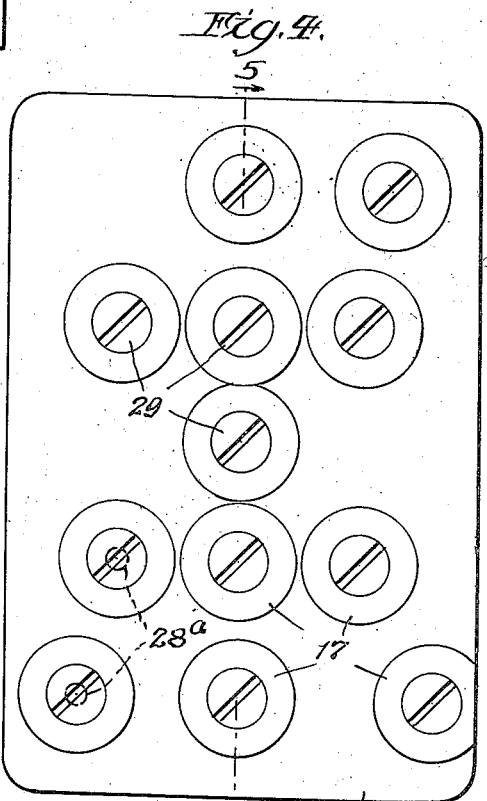
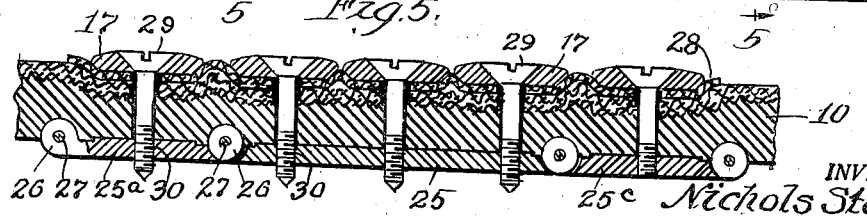
INVENTOR.
Nichols Stevens,
BY Charles O. Shurely
his Atty.

Patented Apr. 20, 1948

2,439,876

UNITED STATES PATENT OFFICE 2,439,876

TIRE REPAIR DEVICE

Nichols Stevens, Chicago, Ill.

Application February 13, 1945, Serial No. 577,712

3 Claims. (Cl. 152—369)

This invention relates to repair devices for tire casings and other flexible articles, and its principal object is to provide inner and outer clamp members between which the casing or other article is clamped by a screw extending through one of said members and threaded in the other.

Another object is to provide pivoted together members, adapted to be placed on the outer side of the object to be repaired, whereby said members may conform generally to the shape of said object, together with means on the inner or reverse side of the object, having stems to extend through the object and provided with screw threads whereby the stems may be threadedly engaged with said members.

Another object is to provide a repair device composed of jointed members, individual ones of which may be used to repair a small puncture or cut in a tire casing, together with means on the inner side of the casing, opposing said members and having a screw extending through said means and member for clamping a portion of the wall of the casing between said member and means to prevent the puncture or cut from spreading.

Another object is to provide jointed bars, either straight or cross shaped, whereby to engage over a considerable portion of the outer surface of the tire casing, with means for clamping the bars upon the tire casing whereby to hold the edges of the cut together and thereby prevent the cut from enlarging.

Other objects and advantages will appear in the course of this specification, and with all of said objects and advantages in view this invention consists in the several novel features of construction, arrangement and combination of parts hereinafter fully described and more particularly defined in the appended claims.

The invention is clearly illustrated in the drawing accompanying this specification, in which:

Fig. 1 is a face view of a repair device embodying one form of the invention with certain parts broken away;

Fig. 2 is a vertical section through a fragment of a tire casing with the repair device applied thereto;

Fig. 3 is a plan of a modified form of outer clamp member;

Fig. 4 is a plan of the inner members of the device; and

Fig. 5 is a vertical section through a fragment of a tire casing with the modified form of the repair device applied thereto, the line of section being indicated at 5—5 in Figs. 3 and 4.

Referring to said drawing and first to Figs. 1 and 2, the reference character 10 designates a fragment of a tire casing to which one of the single clamp members is applied. The casing has a puncture extending therethrough, through which extends the threaded shank of a screw 12.

The outer clamp member 13 is shown in the form of a cross, the face thereof which is contiguous with the outer face of the tire casing, having ribs 14 at its ends which when the clamp member 13 is drawn tightly against the tire casing, embed themselves in the outer face of the casing and prevent that part of the casing around the puncture from yielding and thereby enlarging the puncture.

The clamp member 13 is formed with a threaded screw hole 15 at its center to receive the threaded shank of the screw 12.

On the inner face of the casing is placed a strong sheet of fabric 16, having a hole therein for the stem of the screw, and upon said sheet of fabric is placed a crown shaped washer 17 which is somewhat greater in diameter than the clamp member 13 and is formed with an annular bead or rib 18 on the face adjacent the casing which rib cooperates with the ribs 14 of the clamp member to hold the adjacent parts of the tire casing against spreading. The hole in the washer is countersunk to receive the tapered head of the screw 12.

In applying one of the devices to a tire casing having a small puncture, the fabric sheet 16, is applied to the inner face of the casing over the puncture, the washer 17, placed upon the fabric sheet, the clamp member 13, placed on the outer face of the casing over the puncture and the stem of the screw inserted through the washer, the fabric sheet, the casing and screwed into the screw hole of the outer clamp member. The screw should be tightened with sufficient force to embed the ribs of the outer clamp member and washer in the tire casing with the fabric sheet interposed between the inner face of the casing and the washer.

To prevent the washer and head of the screw from injuring the inner tube, a strip of fabric 20 is employed to cover the washer and head of the screw. The fabric strip extends under the washer and has a hole adjacent one end through which the stem of the screw is inserted, and the fabric strip has also a slot 21 adjacent the same end of the strip as the hole. The other end of the strip is slit inwards from its side edges as at 22 to leave two flaps 23 which may be folded over on the dotted lines to permit that end of the strip to be inserted through the slot. By bending the flaps back again they act as shoulders, locking the ends of the strip together with a portion thereof covering the washer and head of the screw.

In the form of the invention illustrated in Figs. 3 to 5 inclusive, the outer clamp member is formed of jointed bars 25, 25a, 25b, 25c, 25d of various shapes and sizes. The ends of the bars are formed with hinge ears 26 through which extend rivets 27. This linkage construction enables the bars to generally follow the curvature of the tire at practically any place thereon. Some of the links are formed with double crosses thus enabling other links to be hinged thereto and lie in lines at right angles to each other. One of the bars 25a, is shown as of a cross shape, others 25b as straight bars, and another 25d as of T shape.

Assuming that the device is applied to a cut extending generally along the circumference of the tread, with the bars 25a, 25 and 25c extending along the crown of the tread, the hinge connections between the bars enable the links 25a, 25 and 25c to follow the circumference of the tire, and the bars 25b, 25d may follow generally the transverse curve. Associated with the washers shown in Fig. 4 is a strong sheet of woven fabric 28 which is perforated as at 28a to permit the screws 29 to be inserted therethrough as in the form shown in Figs. 1 and 2. Likewise washers 17 are placed over the holes in the fabric sheet and the screws are inserted through the washers, the fabric sheet, the wall of the casing and screwed into the bars, which are formed with threaded screw holes 30 for the reception of the screws. By tightening up the screws the wall of the casing around the cut will be tightly clamped between the bars and washers. The hinge ears of the bars will become embedded in the wall of the casing thereby effectively holding the edges of the cut tightly closed. Fabric strips similar to the one shown in Figs. 1 and 2 may be employed to protect the inner tube from injury by the washers and screws.

In applying the outer clamping member to a tire casing it is placed over the cut and the casing is marked with a pencil through the screw holes of the bars, after which holes can be punched through the casing for the screws.

Pointed screws are preferable because they can be more easily inserted through the casing. After the device has been applied to a casing the projecting ends of the screws are cut off.

What I claim as new and desire to secure by Letters Patent is:

1. A repair device for tire casings, comprising a plurality of outer clamp bars, some extending at right angles to others, and all being hingedly connected together, each having a threaded screw hole therein, inner washers, one for each clamp bar, and screws adapted to extend through said washers and through a tire casing disposed between said outer clamp bars and washers, and threaded in said clamp bars.

2. A repair device for tire casings comprising an outer clamp member consisting of hinged together bars, some of which are of cross like form and others being straight, each of said bars having a screw hole therein, washers, one for each bar, and screws adapted to extend through said washers and through a casing clamped between the outer clamp member and washers, said screws being adapted to threadedly engage in said screw holes of the bars.

3. A repair device for tire casings, comprising a plurality of outer clamp bars, some extending at right angles to others, and all being hingedly connected together, each having a threaded screw hole therein, inner washers, one for each clamp bar, screws adapted to extend through said washers and through a tire casing disposed between said outer clamp bars and washers, and threaded in said clamp bars, and a fabric sheet adapted to be interposed between the casing and washers.

NICHOLS STEVENS.

REFERENCES CITED

The following references are of record in the file of this patent:

UNITED STATES PATENTS

| Number | Name | Date |
|---|---|---|
| 585,078 | Bell | June 22, 1897 |
| 776,697 | Sieverling | Dec. 6, 1904 |

FOREIGN PATENTS

| Number | Country | Date |
|---|---|---|
| 431,462 | France | 1910 |